June 16, 1959
A. MEIXNER ET AL
2,890,639
CAMERA FOCUS ADJUSTING MECHANISM
Original Filed July 10, 1953
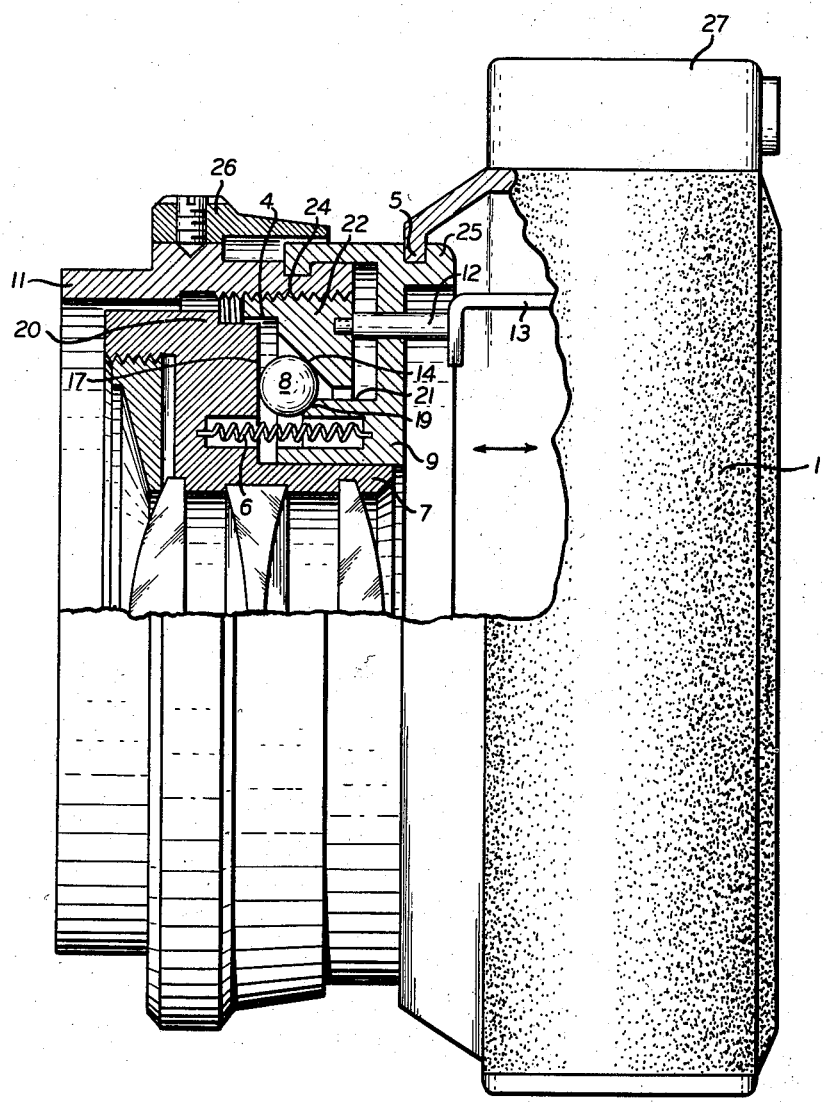
INVENTORS
ALFRED MEIXNER
RICHARD SOMMER
BY
ATTORNEYS.

United States Patent Office 2,890,639
Patented June 16, 1959

2,890,639

CAMERA FOCUS ADJUSTING MECHANISM

Alfred Meixner and Richard Sommer, Braunschweig, Germany, assignors to Voigtländer, A.G., Braunschweig, Germany, a corporation of Germany Original application July 10, 1953, Serial No. 367,288, now Patent No. 2,856,830, dated October 21, 1958. Divided and this application August 12, 1958, Serial No. 754,690

1 Claim. (Cl. 95—45)

This invention relates to a device for the adjustment of parts of optical devices and has particular relation to a device for the adjustment of exchangeable objectives in photographic cameras.

It has been known to adjust parts of optical devices, for example, exchangeable objectives of photographic tube cameras, in such manner that a drive member which is adapted to move over a relatively long path, e. g. a rotary knob, causes displacement of the part to be adjusted over a distance which is relatively short in comparison with said path.

In effecting such adjustment, suitable transmission elements, such as toothed wheels, angle levers having unequal arms, and the like, have been inserted between the drive member and the part to be adjusted.

It has also been known to cause displacements of varying lengths of parts to be adjusted, at equal movements of the drive member by changing the transmission ratio. For example, in the use of conventional exchangeable objectives of different focal lengths, which can be attached to photographic cameras, by equal movements of a drive member, e.g. the adjusting knob of the range finder, different displacements can be brought about by providing each individual exchangeable objective with slots or attached eccentrics of a different pitch, which coact with a guide pin moved always over the same distance by the drive member.

The above mentioned means or devices have often dimensions which require the increase of dimensions of cameras or camera parts or have parts which are subjected to undue tear and wear owing to friction, and/or inaccuracies resulting from easy exchangeability, so that the exactness of adjustment is adversely affected and the production costs become relatively high.

The main object of the present invention is to provide a novel device for the adjustment of parts of optical devices, particularly of exchangeable objectives of photographic cameras. Equal movements of a drive member can likewise bring about displacements of different lengths, by changing the transmission ratio, but the above mentioned difficulties and disadvantages of the known devices are substantially reduced or eliminated in this new device.

Another object of the present invention is to provide a device of the before mentioned type which has relatively small dimensions, can be completely built-in in optical devices or apparatus, is distinguished by low friction and easy running and consists of a few simple parts which can be easily manufactured.

In the device according to the present invention, the gear causing transmission of the driving movement, consists of one stationary element and two parts movable relative to said element, one surface of each of said element and parts forming together a triangle-shaped bearing containing balls or rollers. In said bearing, movement of one of the movable parts, derived from the drive member, forces the balls or rollers into a wedge-shaped gap between said stationary part and the other of the movable parts, whereby the latter is subjected to a certain displacement. The part thus displaced may be the element to be adjusted, or an element which transmits its movement to the element to be adjusted.

The surfaces which inclose the balls or rollers and are in contact with the same, are preferably arranged in such manner that the surface engaging the ball or roller, of the element carrying out the desired displacement, is perpendicular to the direction of displacement so that the pressure of the ball or roller on said part acts in the direction of displacement.

The effect of transmission, i.e. the resulting displacement, depends on the incline or pitch ratio within the triangle-shaped ball or roller bearing which has a wedge-like effect. This ratio is determined by the mutual inclinations of the surfaces engaging the balls or rollers, relative to each other. If the inclination of at least one of the engaging surfaces is changed, a different transmission and, correspondingly, a different displacement will result. Thus, it is possible to obtain a different displacement by substituting for at least one part another part having a different inclination of surface.

In addition to the possibility of changing the displacement of a part to be adjusted by substitution of individual gear parts having different inclination of surfaces, the device according to the invention can be constructed also in such manner that an aggregate of elements to be displaced, which is supposed to carry out always the same predetermined displacement, contains an unchangeable transmission gear according to the invention, i.e. forms a structural unit with said aggregate.

This embodiment is of importance when such aggregates, e.g. exchangeable objectives, are adapted to be attached to an optical device and should be exchangeable for one another. In such case, the optical device is provided with a drive member which is moved always by the same amount, for producing any desired displacement. Each attachable aggregate is thereby subjected to the same drive movement, after its coupling with the optical device and obtains its proper displacement by the unchangeable transmission included in the aggregate.

In general, the parts forming the transmission systems used in carrying out the invention, are manufactured in such manner that they yield directly exact transmissions, i.e. exactly the desired displacements. However, additionally such parts can be adjustable, for example in order to compensate for manufacturing tolerances or for the play of couplings, or the like. In order to attain this, one or more of the surfaces contacting the balls or rollers may be capable of swinging, displacement or may be otherwise adjustable.

In applying the present invention to exchangeable photographic objectives, for which the device according to the invention is particularly suitable in view of its small dimensions and easy running, various embodiments can be used.

According to one embodiment, a displaceable, but not rotatable, lens carrier likewise provided with an exterior flange, which is perpendicular to the optical axis, is journalled in a rotatable objective tube. The lens carrier is elastically drawn against a tubular, interior stationary projection toward the camera, whereby the bevelled ring surface of the projection forms again an adjustable keyway with the flange of the lens carrier. The balls, which force widening of the keyway and thus bring about displacement, are pressed by a funnel-shaped interior wall of a threaded ring into the keyway. In a manner known by itself, displacement of the threaded ring, which is prevented from rotation, is effected by turning the tube, an interior thread of which engages the exterior thread of the ring.

From the driving members serving for effecting displacements, for example from the beforementioned slide for displacing the balls or the threaded ring, movements of other members, particularly the adjustment of rangefinders, can be derived.

The appended drawing illustrates a camera provided with an exchangeable objective, in which displacement is brought about by a worm gear drive.

In the device illustrated in the drawing, adjustment is effected by turning the objective tube. In this device, the exchangeable objective is attached to camera body 1 by means of bayonet catch 5. Objective tube 11 is provided with an interior thread 24 and is rotatable in member 25. Lens carrier 7 is housed by tube 11, and is displaceable, but cannot be rotated in the tube. It is permanently urged toward the camera by spring 6 and has an outwardly extending flange 20, having a plane surface 17. Member 25, which serves for attachment of the exchangeable objectives, is provided with a tubular, axially extending projecting part 21, provided with a bevelled front surface 19. Surfaces 17 and 19 form an adjustable wedge-shaped gap, which houses balls 8. This wedge-shaped ball bearing is closed by the funnel-shaped inclined interior surface 14 of a threaded ring 22. The latter is displaceably but not rotatably held by pin 12, which is connected with said ring and displaceable in member 25. Rod 13, which serves for adjustment of the rangefinder, is connected with pin 12. Rotatable tube 11 is provided with an indicator 26, which moves on a scale (not shown) on the periphery of stationary member 25.

This device operates as follows.

In infinite position of the objective, lens carrier 7 is drawn by spring 6, as much as possible, toward camera 1, and balls 8 are pressed between surfaces 17 and 19 outwardly, i.e. radially away from the optical axis. If now, for sharp focusing of the objective, for example to a smaller distance, tube 11 is turned, for example in conventional manner by hand, ring 22, which is displaceable, but not rotatable, will be moved in conventional manner in the direction of picture taking. Thereby, its funnel-shaped interior surface 14 forces balls 8 into the wedge-shaped gap of surfaces 17 and 19, so that the lens carrier must move in the direction of picture taking. Upon displacement of ring 22, simultaneously pin 12 connected therewith, is advanced and thus, over rod 13, rangefinder 27 of camera 1, is also adjusted, in conventional manner.

It will be understood that this invention is not limited to the specific parts, constructions, designs and other details specifically disclosed above and illustrated in the drawing and can be carried out with various modifications.

Reference is made to our co-pending application Serial No. 367,288, filed in the United States Patent Office July 10, 1953, of which this is a division, now Patent No. 2,856,830, issued October 21, 1958.

What is claimed is:

A device for the adjustment of exchangeable objectives of a photographic tube camera, said device comprising in combination an objective tube rotatably arranged in a tubular member for releasably connecting the objective tube with the camera; said objective tube being provided with an interior thread and displaceably, but non-rotatably, housing a lens carrier having a flange extending outwardly in perpendicular direction to the optical axis and being elastically urged by a spring toward a tubular, stationary interior member having a bevelled annular end surface and forming part of said tubular connecting member; a threaded ring arranged in the objective tube, said ring having a funnel-shaped interior wall and being adapted to be displaced by turning the objective tube; balls enclosed in an annular space which is defined by said flange surface, said bevelled annular end surface and said funnel-shaped interior wall surface, said surfaces being arranged to approximate the form of a triangle; said threaded ring being connected with a pin which is axially displaceable in said tubular connecting member and is adapted to be connected with means for coupling it with a range-finder.

References Cited in the file of this patent

UNITED STATES PATENTS

| 2,138,059 | Becker | Nov. 29, 1938 |
| 2,313,567 | Mihalyi | Mar. 9, 1943 |
| 2,358,121 | Wittel | Sept. 12, 1944 |
| 2,467,456 | Baer | Apr. 19, 1949 |

FOREIGN PATENTS

| 264,426 | Germany | Sept. 24, 1913 |
| 1,014,069 | France | May 21, 1952 |